(12) United States Patent
Blankenship et al.

(10) Patent No.: US 8,067,711 B2
(45) Date of Patent: Nov. 29, 2011

(54) DEPOSITION APPARATUS AND METHODS

(75) Inventors: Donn R. Blankenship, Southbury, CT (US); David A. Rutz, Glastonbury, CT (US); Norman A. Pietruska, Durham, CT (US); Paul H. Zajchowski, Enfield, CT (US); Gary Shubert, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 1563 days.

(21) Appl. No.: 11/181,616

(22) Filed: Jul. 14, 2005

(65) Prior Publication Data

US 2010/0096368 A1  Apr. 22, 2010

(51) Int. Cl.
*B23K 10/00* (2006.01)
(52) U.S. Cl. ............ 219/121.4; 219/76.16; 219/121.48
(58) Field of Classification Search ............ 219/121.47, 219/76.16, 76.15, 121.59, 121.48, 121.51, 219/75
See application file for complete search history.

(56) References Cited

U.S. PATENT DOCUMENTS

| | | | |
|---|---|---|---|
| 4,008,844 A | 2/1977 | Duvall et al. | |
| 4,256,779 A | 3/1981 | Sokol et al. | |
| 4,285,459 A * | 8/1981 | Baladjanian et al. | 228/119 |
| 4,830,934 A * | 5/1989 | Ferrigno et al. | 428/678 |
| 5,240,491 A * | 8/1993 | Budinger et al. | 75/255 |
| 5,395,584 A * | 3/1995 | Berger et al. | 420/443 |
| 6,177,046 B1 * | 1/2001 | Simkovich et al. | 420/444 |
| 6,744,005 B1 * | 6/2004 | Beyer et al. | 219/121.41 |
| 2005/0015980 A1 * | 1/2005 | Kottilingam et al. | 29/888.011 |
| 2005/0067065 A1 * | 3/2005 | Fernihough et al. | 148/512 |
| 2005/0067466 A1 * | 3/2005 | Boegli et al. | 228/119 |

FOREIGN PATENT DOCUMENTS

| | | |
|---|---|---|
| EP | 1088909 A2 | 4/2001 |
| EP | 1685923 A1 | 8/2006 |

OTHER PUBLICATIONS

Chang-Jiu Li et al., Microstructure and Property of Al2O3 Coating Microplasma-Sprayed Using a Novel Hollow Cathode Torch, Materials Letters, Jan. 2004, vol. 58, No. 1-2, pp. 179-183.
Wu Xiaowei et al., Evaluation of Transient Liquid Phase Bonding Between Nickel-Based Superalloys, Journal of Materials Science, Mar. 15, 2001, vol. 36, No. 6, pp. 1539-1546.
European Search Report for European Patent Application No. EP06252223, dated Feb. 19, 2010.

* cited by examiner

*Primary Examiner* — Mark Paschall
(74) *Attorney, Agent, or Firm* — Bachman & LaPointe, P.C.

(57) ABSTRACT

Microspray apparatus and methods involve injecting powdered material into a plasma gas stream. The material comprises first and second component powders. The second powder is a majority by the weight of the powdered material. The first powder acts as a melting point depressant. The first and second powders may have similar compositions but with the first powder including a greater quantity of a melting point depressant element.

22 Claims, 4 Drawing Sheets

DEPOSITION APPARATUS AND METHODS

BACKGROUND OF THE INVENTION

The present disclosure generally relates to spray deposition methods and apparatus and, more particularly, deposition on high temperature components of gas turbine engines.

Well developed fields exist regarding plasma spray deposition. U.S. patent application Ser. No. 10/976,560 filed on Oct. 29, 2004 by Zajchowski, et al. and entitled "Method and Apparatus for Microplasma Spray Coating a Portion of a Turbine Vane in a Gas Turbine Engine" discloses an exemplary microplasma spray coating apparatus.

SUMMARY OF THE INVENTION

One aspect of the invention involves a microplasma spray apparatus. A microplasma gun includes an anode, a cathode, and an arc generator for generating an electric arc between the anode and cathode. A nozzle emits arc gas into the electric arc. The electric arc is operable for ionizing the gas to create a plasma gas stream. At least one reservoir contains powdered material. The material includes first and second component powders. The second powder is by a majority, by weight, of the powdered material. The first powder acts as a melting point depressant. A powder injector is coupled to the reservoir for injecting the powdered material into the plasma gas stream.

Another aspect of the invention involves a method for replacing material lost from a site on a substrate. A microplasma spray is formed from a multi-powder combination of at least a first metal powder and a second metal powder. The spray is directed to a substrate to form a deposit.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
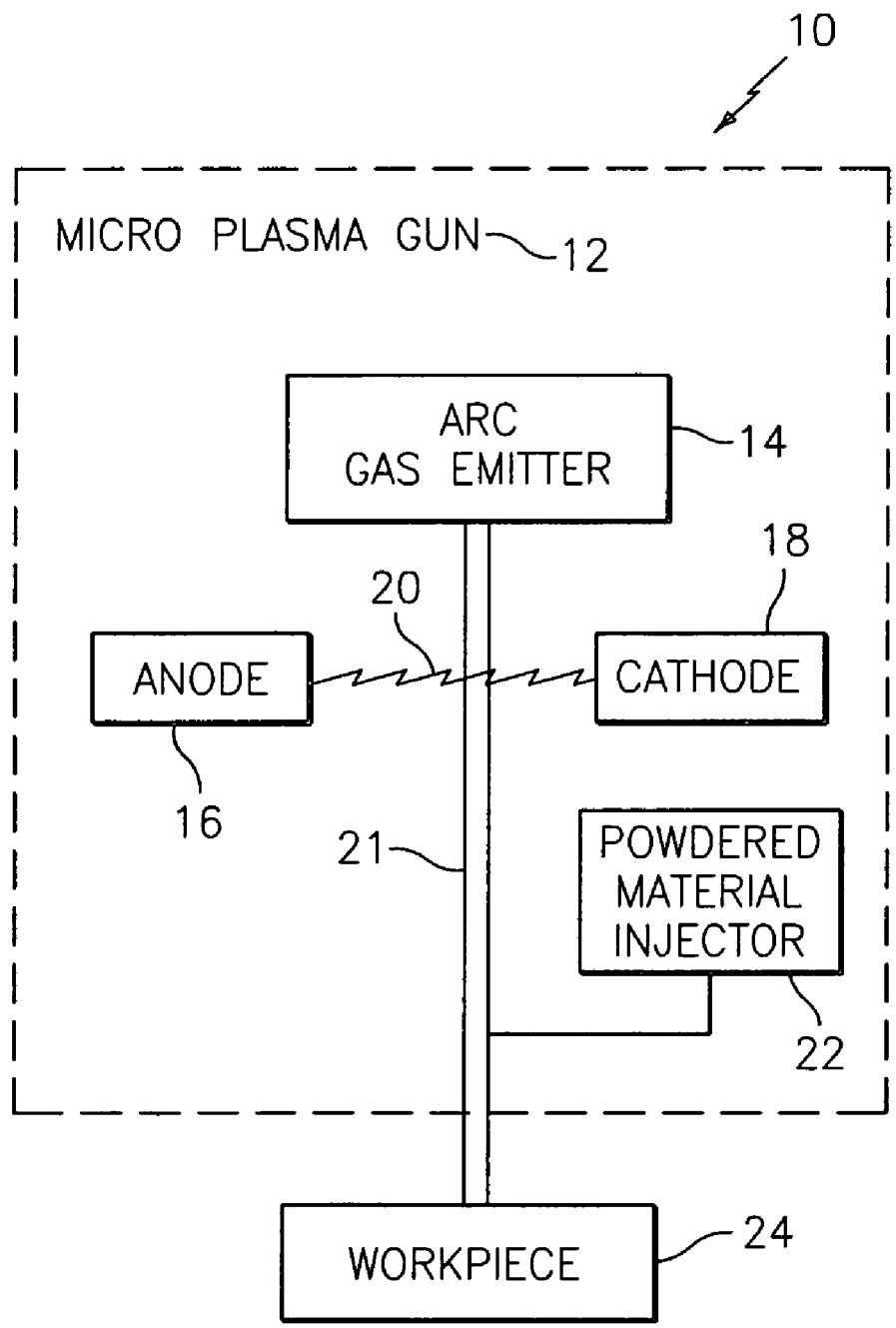
FIG. 1 is a schematic view of a microplasma spray gun and a workpiece.

FIG. 1 shows a microplasma spray apparatus 10. The apparatus may be constructed and operated as in U.S. patent application Ser. No. 10/976,560, the disclosure of which is incorporated herein by reference herein as if set forth at length. The exemplary microplasma spray apparatus 10 includes a microplasma gun 12 having an arc gas emitter 14, an anode 16, and a cathode 18. An electric arc 20 is generated between the anode 16 and cathode 18. A plasma stream 21 is formed when arc gas is injected from the arc gas emitter 14 through the arc 20. A powdered material injector 22 dispenses powdered material into the plasma gas stream, which transports the powdered material to the workpiece 24. As a result, the powdered material forms a deposit on a desired location on the workpiece 24.

The powdered material is not, however, initially provided as a single powder of a single alloy. Rather, powders of multiple alloys are provided either pre-mixed or mixed by the apparatus. The component powders may be selected in view of the workpiece properties. The workpiece may consist of or comprise a nickel-based superalloy substrate. The apparatus may be used to form a deposit for replacing parent material lost from the substrate (e.g., due to damage plus cleaning and preparation) or to augment (e.g., fill a manufacturing defect, coat with a dissimilar material, or otherwise). Exemplary powdered material combinations are disclosed in U.S. Pat. No. 4,008,844, the disclosure of which is incorporated by reference herein as if set forth at length. The exemplary powder material includes a transient liquid phase (TLP)-forming powder and a main powder. The exemplary main powder may have a composition similar to the desired deposit. The TLP powder may have an otherwise generally similar composition but including at least one melting point depressant such as boron. For nickel-based superalloys, exemplary boron concentrations in the main powder are preferably less than 1% (by weight), preferably less than 0.5%, and more preferably essentially zero (or the level in the substrate). For the TLP-forming powder, exemplary boron concentrations are at least 2%, more preferably at least 2.5%.

Figure 2:
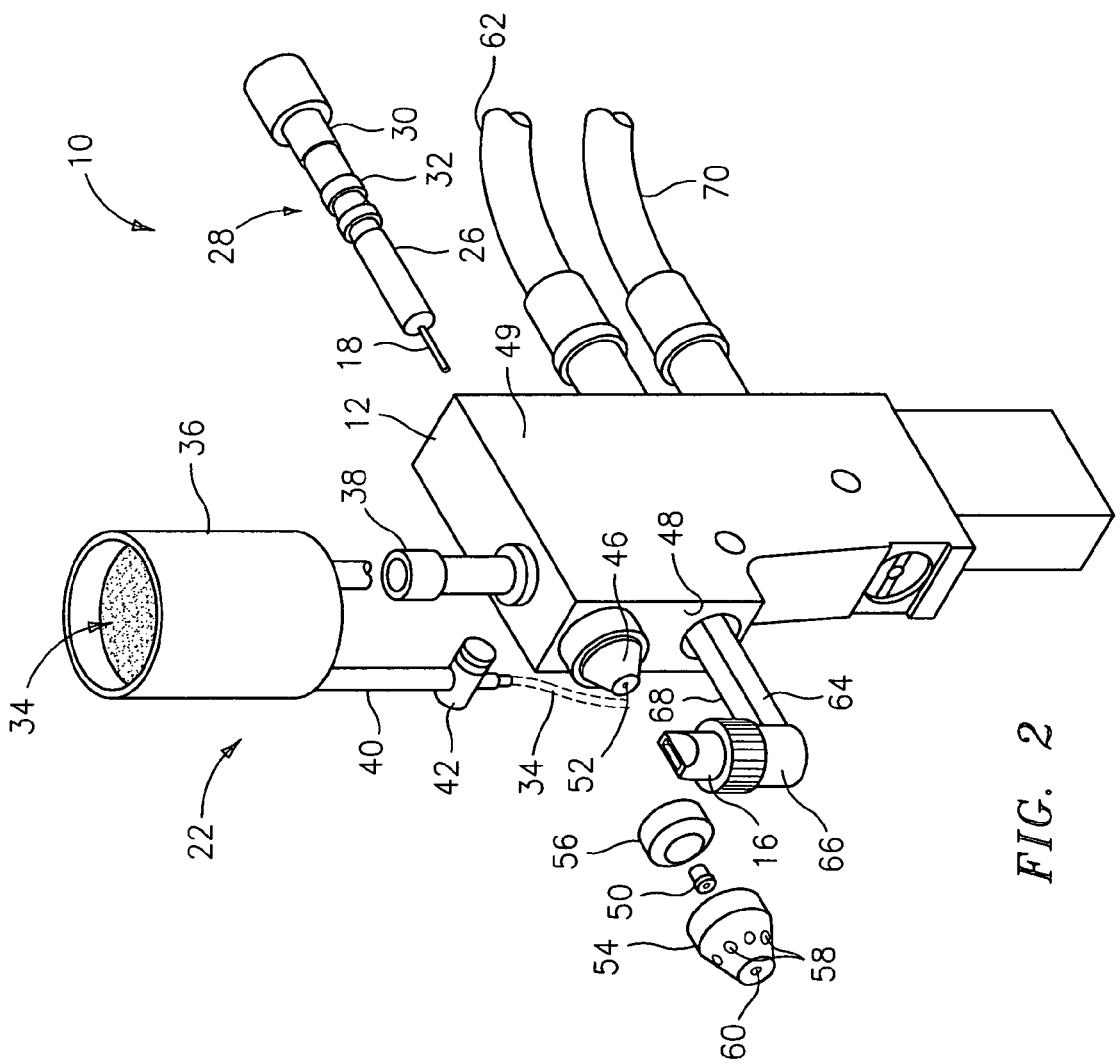
FIG. 2 is a partially exploded view of a microplasma spray apparatus.
Figure 3:
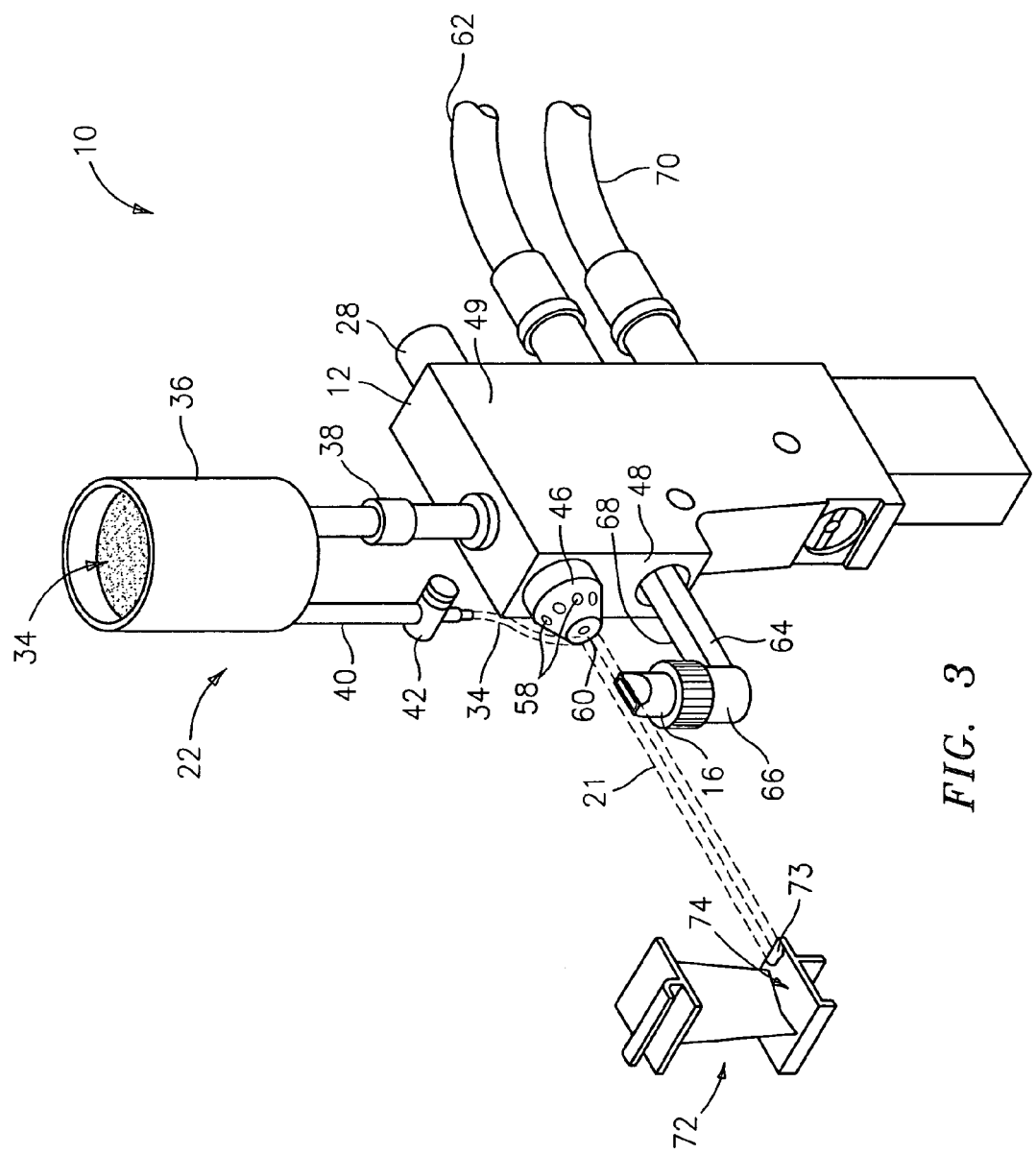
FIG. 3 is a view of the microplasma spray apparatus of FIG. 2 applying a material to a workpiece.

FIGS. 2 and 3 show further details of one exemplary microplasma spray apparatus 10. The apparatus 10 may be operable for depositing material on many things, including, but not limited to at least a portion of a HPT or LPT vane 72 in a gas turbine engine (not shown). HPT vanes are particularly relevant components. Whereas turbine blades are typically single crystal or directionally solidified (DS) structures, HPT vanes are typically non-crystalline. The present microplasma repair process may provide the repair with properties highly similar to those of the undamaged vane substrate. Thus, the method may advantageously be used to repair localized vane damage (e.g., foreign object damage, erosion, or thermal fatigue damage) along surfaces exposed to the turbine gas path.

In the exemplary embodiment, the cathode 18 is held within and extending from an insulated body 26 of a cathode cartridge or assembly 28. The exemplary cartridge 28 also includes threads 30 for threadingly engaging the microplasma gun body. The exemplary cathode 18 also includes an O-ring seal 32 to seal the leak path that is created at the interface between the cartridge 28 and the microplasma gun body.

In operation, an electric arc 20 (FIG. 1) is generated between the anode 16 and cathode 18. Arc gas such as, but not limited to, argon is emitted into the electric arc 20. The arc gas can be emitted prior to generating the electric arc. The electric arc ionizes the gas to create the plasma gas stream 21. The ionization process removes electrons from the arc gas, causing the arc gas to become temporarily unstable. The arc gas heats up to approximately 20,000°-30,000° F. as it re-stabilizes. The plasma stream cools rapidly after passing through the electric arc.

A powdered material injector 22 injects powdered material 34 into the plasma gas stream 21. The powdered material 34 is heated to a super-plastic state in the plasma stream and is deposited on the vane (FIG. 3) where it cools and re-solidifies to form the deposit. The exemplary powdered material injector 22 includes a powder hopper 36 for holding the powdered material 34. The exemplary hopper 36 is attached to the microplasma gun 12 via a connector 38 formed on the microplasma gun 12. The powdered material 34 is channeled through a discharge tube 40 and controlled by a valve 42 positioned in the discharge tube 40. The valve 42 can be mechanical or electromechanical as is known to those skilled in the art. There may be multiple hoppers (e.g., to contain multiple components mixed at discharge/injection. Powder may alternatively be injected into the plasma stream via one or more powder gas lines from one or more remote powder feeders (not shown).

A nozzle shroud 46 positioned on a forward wall 48 of the microplasma gun 12 holds a nozzle insert 50 and permits the electrode 28 to extend through a center aperture 52 formed in the nozzle shroud 46. The nozzle insert 50 can be threadingly attached to an end of the nozzle shroud 46. A shield gas cap 54 is positioned adjacent the nozzle shroud 46. An insulator 56 is positioned between the shield gas cap 54 and the nozzle shroud 46 to electrically isolate the shield gas cap 54 from the nozzle shroud 46. The shield gas cap 54 can be pressed to fit onto the nozzle shroud 46 and over the insulator 56. The shield gas cap 54 includes a plurality of through apertures 58 for permitting shield gas to flow therethrough and shield the arc gas from ambient atmosphere. A center aperture 60 formed in the shield gas cap 54 permits high velocity arc gas to pass through and into the electric arc.

Cooling fluid, such as water or the like, may be utilized to cool the microplasma gun 12. The cooling fluid is delivered to the microplasma gun 12 via a cooling fluid hose 62. The cooling fluid traverses through internal passages (not shown) in the microplasma gun 12 and flows through an inlet passage 64, into an anode holder 66 and back through an outlet passage 68. The cooling fluid reduces the temperature of the anode 16 during operation of the microplasma gun 12. The cooling flow rate may be approximately 1.0-1.5 gallons per minute. A second conduit 70 is connected to the microplasma gun 12. The second conduit may be operable for providing electrical power, arc gas, and shield gas to the microplasma gun 12.

FIG. 3 shows the vane 72 having a localized a damage site 73 along a platform 74. Such a damage site 73 or other localized area may receive a deposit of the powdered material 34. The plasma gas stream 21 is directed toward the damage site 73. The site may be a raw damage site or a treated site (e.g., where further material has been machined from the vane substrate such as to remove contaminants). The added material strengthens the area under repair by substantially reinforcing the eroded/machined repair surface. The repair site, when fully processed (e.g., by heat treatment processing) has mechanical properties approaching those of the parent part surface.

The microplasma gun 12 may be operated at a relatively low power range of between approximately 0.5 Kilowatts and 2.5 Kilowatts. The low power output of the microplasma gun 12 significantly reduces the heat flow into the vane 72 over that of conventional coating methods. The maximum surface temperature of the vane 72 caused by the coating process is approximately 200° F. depending on the mass of the vane. The microplasma gun 12 is operable for applying powdered material 34 to a thin wall area of the vane 72 without distorting the vane 72 because the low power output limits the localized stress caused by high thermal gradients.

The microplasma gun 12 can apply the material in small spots (e.g., 2-4 mm in diameter) or be swept to apply narrow strips (e.g., 2-4 mm in width). This permits accurate surface coating even with a hand held device. The small spot/strip size may substantially eliminate the need for masking or otherwise covering the vane 72 in areas where the material is unwanted. The nozzle opening size controls the spray pattern. The hand-held version of the microplasma gun 12 may be sufficiently accurate that material can be sprayed on components while they remain installed in an engine or the like.

An exemplary arc gas flow rate of the microplasma apparatus 10 may be 1.5-3 liters per minute. As stated above, the arc gas and shield gas are typically argon, but any suitable inert gas can be utilized. An exemplary shield gas flow rate ranges may be 2-4 liters per minute for a typical application.

The powder hopper 36 holds the powdered material 34 prior to being injected into the plasma gas stream 21 by the powder injector 22. The powdered material 34 can be injected into the plasma gas stream 21 either through gravity feed or through a pressurized system (not shown). The shut-off control valve 42 controls the powdered material 34 feed rate into the plasma gas stream 21. Powdered material 34 is transferred to the vane 72 at an exemplary 1-30 grams per minute. The microplasma gun 12 may apply the material from exemplary distances of 3-16 cm to the vane 72, but can vary depending on the coating application requirements. The exemplary microplasma spray gun 12 can be oriented between a positive 45° angle and a negative 45° angle relative to a normal axis of the vane and still provide adequate material delivery with a gravity feed system. A pressure feed system may provide greater orientational freedom for the microplasma gun 12. The microplasma spray gun 12 advantageously generates a relatively low noise level that ranges (e.g., 40-70 dB) due to the low power output, thereby making the apparatus 10 suitable for hand held application. Current U.S. government regulations require hearing protection when environmental noise reaches 85 dB. The microplasma spray apparatus 10 can be hand held or alternatively held in an automated fixture (not shown) that is computer controlled.

Figure 4:
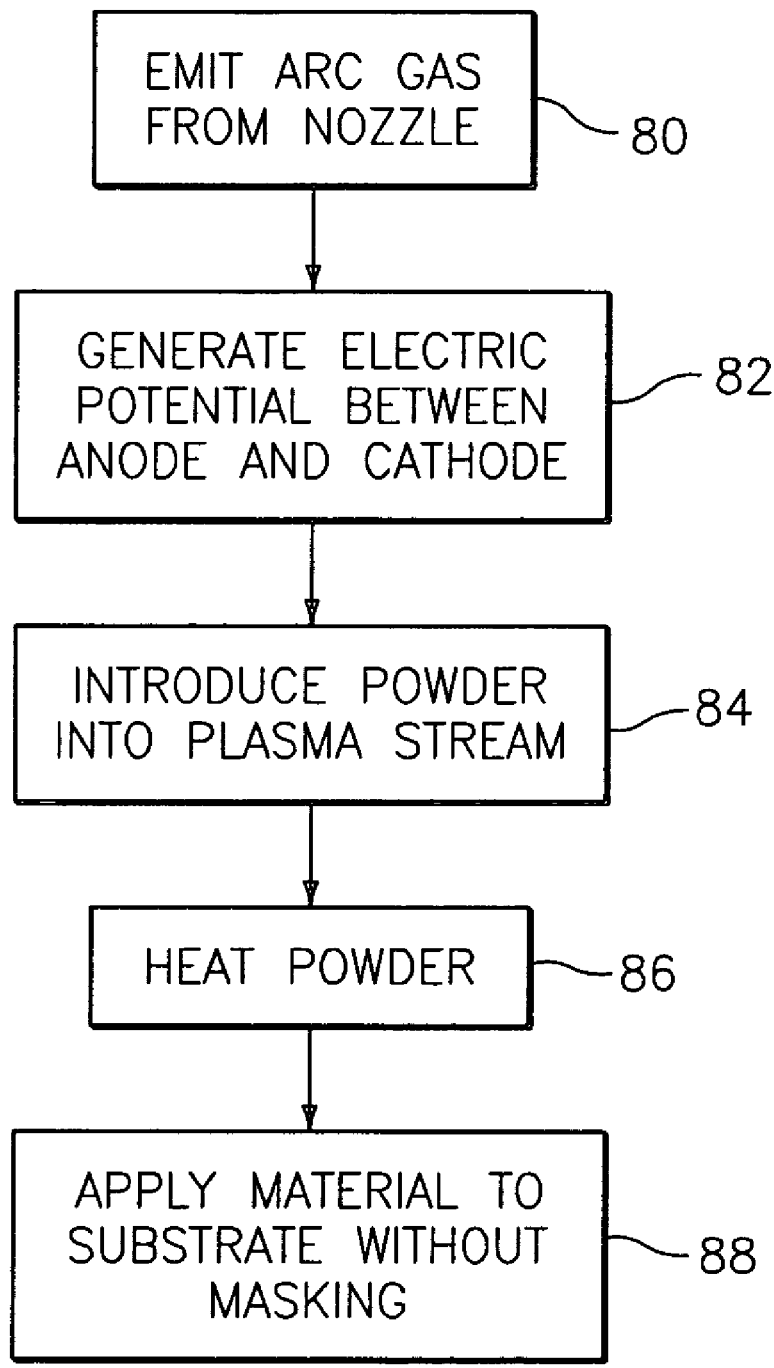
FIG. 4 is a flowchart of a process applying the material.

FIG. 4 shows the operation of the microplasma spray apparatus 10. Initially, at block 80, arc gas is emitted from the nozzle insert 50. An electric potential is generated between the anode 16 and the cathode 18 of the plasma spray gun 12 and is directed through the arc gas, as described in block 82. Arc gas is directed through the electric potential to create the plasma stream 21. At block 84, powdered material 34 is injected into the plasma stream 21. At block 86, the plasma stream heats the powdered material 34 to a "super plasticized" condition such that the powdered material 34 is malleable when it is applied to a workpiece. At block 88, the powdered material 34 is applied to an unmasked substrate. The powdered material 34 then bonds with the substrate and cools to form a solid deposit on the substrate.

One or more embodiments of the present invention have been described. Nevertheless, it will be understood that various modifications may be made without departing from the spirit and scope of the invention. For example, various existing or yet-developed apparatus may be used. The nature of the substrate and the amount, nature, and physical form of the desired deposit will also influence any particular implementation. While illustrated with respect to nickel-based superalloy substrates and powders, the methods and apparatus may be used with cobalt-based superalloys. Other cast components include blade outer air seals and transition ducts. Accordingly, other embodiments are within the scope of the following claims.

What is claimed is:

1. A microplasma spray apparatus comprising:
    a microplasma gun including an anode, a cathode, and an arc generator for generating an electric arc between the anode and cathode;
    a nozzle for emitting arc gas into the electric arc, the electric arc operable for ionizing the gas to create a plasma gas stream;
    at least one reservoir of powdered material, the powdered material comprising different composition first and second component powders, the second powder being a majority, by weight, of the powdered material and the first powder acting as a melting point depressant; and a powder injector coupled to the reservoir for injecting the powdered material into the plasma gas stream.

2. The apparatus of claim 1 used to apply material to a localized area of a turbine vane, the material being applied without masking the vane.

3. The apparatus of claim 1 wherein:
the first powder component includes in its composition a quantity of a melting point depressant substantially in excess of that in the second powder.

4. The apparatus of claim 1 wherein:
the at least one reservoir is a single reservoir containing a mixture of the first and second component powders.

5. The apparatus of claim 1 wherein:
the first and second component powders are present in a mass ratio of between 1:10 and 1:2.

6. The apparatus of claim 1 wherein:
the first component powder has at least 2.5% boron; and
the second component powder has less than 0.5% boron.

7. The apparatus of claim 1 wherein:
the first component powder has at least 2% boron; and
the second component powder has less than 1% boron.

8. The apparatus of claim 1 wherein:
the first and second component powders are nickel-based.

9. A method for replacing material lost from a site on a substrate comprising:
forming a microplasma spray from a multi-powder combination of at least a first metal powder and a second metal powder, different in composition from the first metal powder; and
directing the microplasma spray to a substrate to form a deposit.

10. The method of claim 9 wherein:
the first and second metal powders are nickel-based; and
the substrate is nickel-based.

11. The method of claim 9 wherein:
the first metal powder has at least 2% boron; and
the second metal powder has less than 1% boron.

12. The method of claim 11 performed without masking the substrate.

13. A microplasma spray method comprising:
providing a microplasma gun including an anode and a cathode;
injecting inert arc gas from a nozzle;
generating an electric arc between the anode and the cathode through the arc gas;
ionizing the arc gas with the electric arc to form a plasma gas stream;
injecting powdered material into the plasma gas stream, the material comprising different composition first and second component powders, the second powder being a majority, by weight, of the powdered material and the first powder acting as a melting point depressant for the second powder; and
directing the plasma gas stream to a substrate to form a deposit from said powdered material.

14. The method of claim 13 wherein:
the deposit is formed on a localized area of the substrate without masking the substrate.

15. The method of claim 13 wherein:
the first and second component powders are injected in a mass flow ratio of between 1:10 and 1:2.

16. The method of claim 13 wherein:
the first and second component powders are injected in a mass flow ratio of between 1:9 and 1:6.

17. The method of claim 13 wherein:
the first powder comprises a melting point depressant substantially in excess of that in the substrate and sufficient to provide melting of a portion of the mix at a processing temperature below the melting temperature of the substrate; and
the second powder has a composition that approximates that of the substrate.

18. The method of claim 17 wherein:
the melting point depressant is boron.

19. The method of claim 13 wherein:
the first powder comprises a melting point depressant in excess of that in the substrate and second powder and sufficient to provide melting of a portion of the mix at a processing temperature below the melting temperature of the substrate; and
the second powder has a composition in which contents of all elements other than a base material are within 2% of those of the substrate.

20. The method of claim 13 used to remanufacture a turbine engine cast superalloy component which has lost material from the substrate due to cracking or erosion.

21. The method of claim 13 used to remanufacture a turbine engine vane which has lost material from the substrate.

22. The method of claim 13 used to remanufacture a turbine engine vane which has lost material from the substrate and being performed with the engine and substrate in situ installed on the aircraft.

* * * * *